(12) United States Patent
Bogicevic et al.

(10) Patent No.: US 6,495,279 B1
(45) Date of Patent: Dec. 17, 2002

(54) ULTRAHIGH POWER DENSITY MINIATURIZED SOLID-OXIDE FUEL CELL

(75) Inventors: Alexander Bogicevic, Canton, MI (US); Christopher Mark Wolverton, Saline, MI (US); David Robert Bauer, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,647

(22) Filed: Oct. 2, 2001

(51) Int. Cl.[7] .............................. H01M 8/12; H01M 4/88
(52) U.S. Cl. ........................ 429/32; 502/101; 427/115
(58) Field of Search ........................ 429/32; 427/115; 502/101

(56) References Cited

U.S. PATENT DOCUMENTS

| | | | |
|---|---|---|---|
| 4,476,196 A | * 10/1984 | Poeppel et al. | 429/32 |
| 5,508,128 A | * 4/1996 | Akagi | 429/32 X |
| 5,683,828 A | 11/1997 | Spear et al. | |
| 5,750,013 A | * 5/1998 | Lin | 427/115 X |
| 5,753,385 A | 5/1998 | Jankowski et al. | |
| 5,856,035 A | * 1/1999 | Khandkar et al. | 429/32 |
| 5,858,567 A | 1/1999 | Spear, Jr. et al. | |
| 5,863,671 A | 1/1999 | Spear, Jr. et al. | |
| 5,879,827 A | 3/1999 | Debe et al. | |
| 5,935,727 A | * 8/1999 | Chiao | 429/32 |
| 5,942,349 A | 8/1999 | Badwal et al. | |
| 5,993,986 A | * 11/1999 | Wallin et al. | 429/32 |
| 6,007,683 A | 12/1999 | Jankowski et al. | |
| 6,013,386 A | 1/2000 | Lewin et al. | |
| 6,077,621 A | 6/2000 | Allen et al. | |
| 6,106,967 A | * 8/2000 | Virkar et al. | 429/32 X |
| 6,159,533 A | 12/2000 | Dearnaley et al. | |

* cited by examiner

Primary Examiner—Stephen Kalafut
(74) Attorney, Agent, or Firm—Damian Porcari

(57) ABSTRACT

A miniaturized solid-oxide fuel cell and process for making the same are provided. A fuel cell is provided that contains an electrolyte material, electrodes, and interconnects. Manifolds can be placed either within the electrodes or within the interconnects. Techniques common to the microelectronic industry are used to manufacture a miniaturized fuel cell. The miniaturized fuel cell is created by stacking individual fuel cells over one another to maintain a sufficient level of power density and durability.

67 Claims, 2 Drawing Sheets

☐ FC STACK
◉ FUEL IN        ○ EXHAUST
◉ AIR IN         ○ AIR OUT

ULTRAHIGH POWER DENSITY MINIATURIZED SOLID-OXIDE FUEL CELL

BACKGROUND OF INVENTION

The present invention relates to solid-oxide fuel cells and methods of making the same. More particularly, the present invention relates to concepts and processes for miniaturizing solid oxide fuel cells while maintaining substantial power output, thus increasing the power density.

A fuel cell is an electrochemical device in which electrical energy is generated by chemical reactions without altering the basic components of the fuel cell—the electrodes and the electrolyte. Fuel cells may be used to combine hydrogen or other reformed fuels with oxygen without combustion to produce direct current electric power. The process can be described as electrolysis in reverse, where the fuel cell converts chemical energy continuously into electrical energy without requiring an intermediate conversion to thermal energy.

Fuel cells have been pursued as a source of power for transportation because of their high energy efficiency, their potential for fuel flexibility, and their extremely low emissions. Fuel cells have potential for stationary and vehicular power generation applications; however, the commercial viability of fuel cells for power generation in these applications depends upon solving a number of manufacturing, cost, and durability problems. Despite decades of intensive cross-disciplinary research, the current cutting edge solid-oxide fuel cell (SOFC) technology is still deficient in establishing itself as a viable alternative to more traditional power generation. This deficiency is even more pronounced for mobile applications, where power density requirements are exceedingly high because of size and weight limitations for onboard fuel cells. The high efficiency, cleanliness, and inherent simplicity of SOFC technology captures the best properties of other approaches like the proton-exchange membrane (PEM) fuel cell, while providing the compatibility with existing fuel cell delivery infrastructure and the impurity tolerance required for mobile use. With current SOFC technology, the high operating temperature of fuel cell stacks requires complex and costly materials, and leads to exceedingly slow start-ups, which is incompatible with nominal vehicle operation. Even in the most advanced SOFC products available today, the power density is insufficient for most auxiliary-power unit applications, and only a fraction of what it needs to be for powertrain operations. Accordingly, there remains a need in this art for solid-oxide fuel cells, and processes for their fabrication that alleviate the above-mentioned problems.

A single fuel cell is comprised of several layers including an anode, electrolyte, cathode, and interconnect. One or more of these layers must contain a distribution system to deliver air and fuel to the electrodes. The volumetric power density is determined by the areal power density of a single fuel cell and the repeat distance for the stacking of said individual fuel cells. The areal power density is limited by resistive and polarization losses and possibly mass flow limitations. The losses typically increase with decreasing temperature. Under realistic operating conditions, a 0.5–1.0 W/cm$^2$ areal power density (including gas manifolding) is reasonably close to the upper limit of current technology. The repeat distance for current technology is at best about 4 mm, partially due to the need for the fuel cells to be self-supporting, and also due to the use of macroscopic manufacturing techniques in the production of the fuel cell. These traditional fuel cells have volumetric power densities that at best have the potential to achieve 1–2 kW/L for hydrogen-fed fuel cells, i.e. disregarding reformers and packaging which will significantly lower this value, which should be viewed as an upper bound. The main idea of the present invention is a new strategy to improve volumetric power density by decreasing the repeat distance. This new fuel cell concept and the processes for its fabrication also alleviate many of the above-mentioned problems and limitations with durability and start-up.

SUMMARY OF INVENTION

The present invention provides a way of addressing the above mentioned problems by using a novel method for manufacturing miniaturized solid-oxide fuel cells so as to ensure sufficient power density. The present invention uses processes common to the manufacturing of microelectronics devices to shrink certain key dimensions of individual fuel cells and stacks of fuel cells in order to provide sufficient power density and durability.

Accordingly to one aspect of the invention, a miniaturized stacked fuel cell and process for its manufacture is provided wherein an interconnect is deposited on a sacrificial material, such as bulk YSZ, sapphire, or another refractory material which meets epitaxial and stability requirements. A first electrode layer is then deposited on the interconnect. An electrolyte material is deposited on the first electrode layer. Finally, a second electrode layer is deposited onto the electrolyte material. These steps are repeated, without the use of a sacrificial material, in order to fabricate a stacked fuel cell n times, where n is greater than 1. Preferably, n is as high as 1000. More Preferably n is greater than 1000.

A sacrificial material is used only once in the process, at the construction of the first individual fuel cell. The subsequent cells, which are stacked onto one another in the same manner as the first cell, are done so without an initial sacrificial support. Thus, the interconnect which begins the formation of the next fuel cell is deposited directly on the second electrode layer of the previous fuel cell. Manifolds for delivering reactants to anodes and cathodes in the fuel cell assembly can be placed in either the interconnect or in the electrode layers. If manifolding is done in interconnects, flow channels are created on both major sides of each interconnect. If manifolding is done in the electrodes, flow channels are created on one side only of each electrode, namely the one facing the interconnect.

The assembly of the miniaturized fuel cell is performed by various vapor deposition, lithography, and masking/etching techniques akin to processes used in the microelectronics industry to manufacture transistors and other components. The repeat distance of the stacked fuel cell is generally less than about 0.5 mm, a nearly 10-fold reduction compared to conventional fuel cells. Further reductions in repeat distance and concomitant increase in power density is possible if pressure drops in the manifolds can be kept at an acceptable level. An interlayer may be placed between either electrode and the electrolyte to improve areal power density. The interlayer may be about 0.001 to about 1 micron thick, and in one preferred embodiment consist of isovalently or aliovalently doped ceria-based ceramics.

Accordingly, it is a feature of the present invention to provide a miniaturized solid-oxide fuel cell and process for forming the fuel cell. This, and other features and advantages of the present invention, will become apparent from the following detailed description, the accompanying drawings, and the appended claims.

DETAILED DESCRIPTION

We have found that by using various processes common to the microelectronics industry but new to the fuel cell industry coupled with stacking fuel cells on top of one another, a miniaturized fuel cell can be created that maintains similar levels of power output as traditional fuel cells, but with a greatly reduced volume and weight, resulting in a substantial increase in power density. By various processes common to the microelectronics industry, it is meant that techniques such as chemical vapor deposition (CVD), micro lithography, and etching can be used on fuel cell materials in order to reduce, or minimize the size of the fuel cell. In addition, gas channels can be formed in the electrodes as well as in the interconnects.

Figure 1:
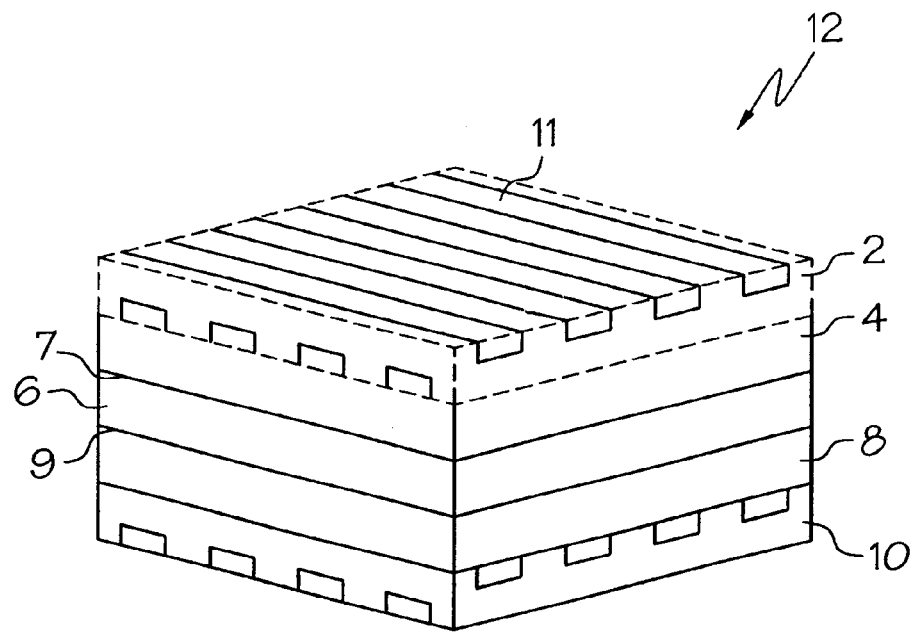
FIG. 1 is a side view of an embodiment of the miniaturized solid-oxide fuel cell.

In a preferred embodiment depicted in FIG. 1, a miniaturized solid oxide fuel cell 12 is shown comprising a layer of electrolyte material 6 having a first major surface 7 and a second major surface 9. A first electrode, cathode, 4 is on the first major surface 7 of the electrolyte material 6. A second electrode, anode, 8 is on the second major surface 9 of the electrolyte material 6. A first interconnect 2 lies on the cathode 4 and a second interconnect 10 lies beneath the anode 8. Within the first and second interconnects 2 and 10 lie a series of manifolds 11. The second interconnect 2 being the interconnect for a second fuel cell that is being stacked on top of the fuel cell depicted. The manifolds are simply channels that deliver gas or fluid mixtures to the portion of the fuel cell in which the manifolds are embedded.

Figure 2:
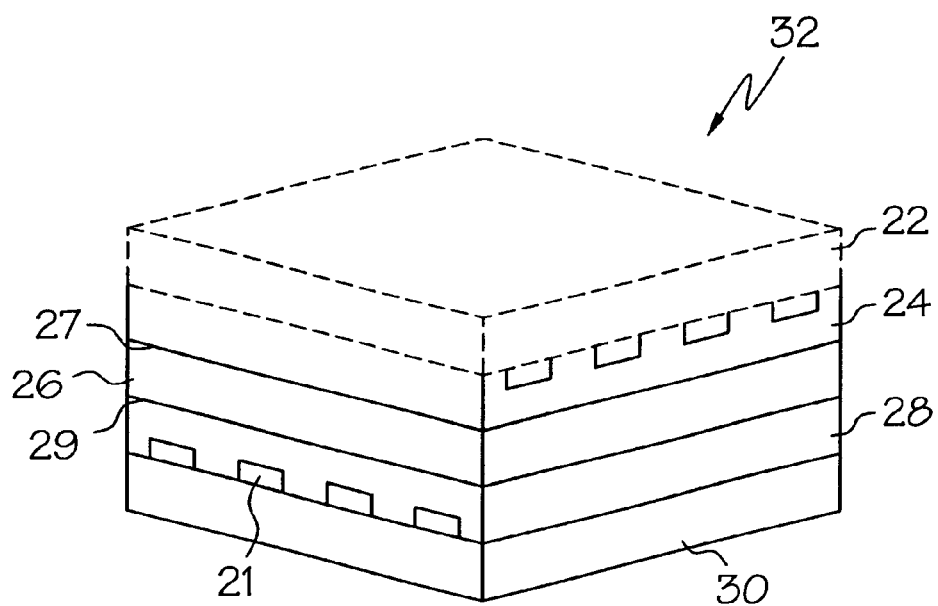
FIG. 2 is a side view of another embodiment of the miniaturized solid-oxide fuel cell.

In another embodiment depicted in FIG. 2, a miniaturied solid oxide fuel cell 32 is shown comprising a layer of electrolyte material 26 having a first major surface 27 and a second major surface 29. A first electrode, cathode, 24 is on the first major surface 27 of the electrolyte material 26. A second electrode, anode, 28 is on the second major surface 29 of the electrolyte material 26. A first interconnect 22 lies on the cathode 24 and a second interconnect 30 lies beneath the anode 28. The second interconnect for the fuel cell 32 is the first interconnect of the next fuel cell, which is stacked on the fuel cell that is depicted. Within the cathode and anode 24 and 26 lie a series of manifolds 21 for delivering fluid to the cathode and anode 24 and 26. If the gas manifolds are located in the electrodes, the interconnects can be thinner while the electrodes can be made thicker. For example, when the gas manifolds are located in the electrodes, the interconnect can be about 10 microns and the electrodes can be about 100 microns.

Figure 3:
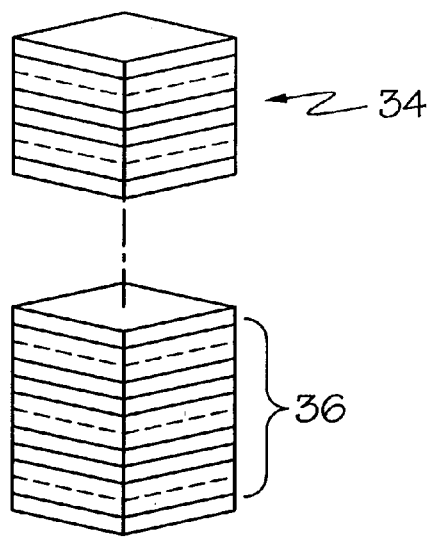
FIG. 3 is an illustration of the stacking of the miniaturized solid-oxide fuel cells.

FIG. 3 shows the stacking of the miniaturized fuel cell. One miniaturized fuel cell 34 is placed on top of other miniaturized fuel cells 36. This stacking process is repeated in order to provide the sufficient amount of power and durability. The process is then repeated in distances that are generally less than about 0.5 mm.

Figure 4:
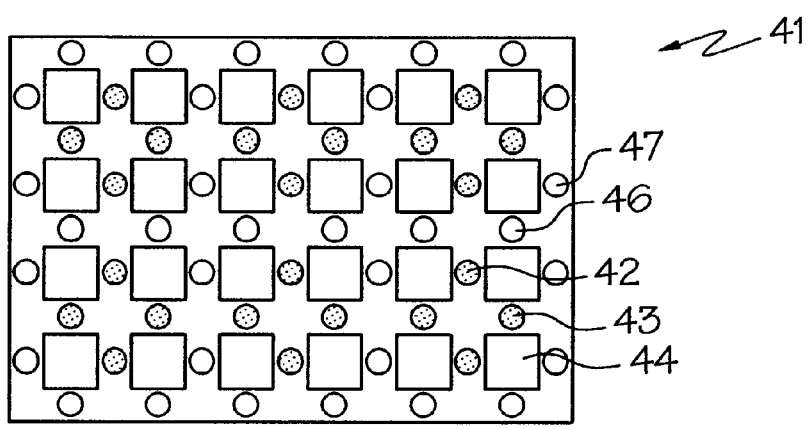
FIG. 4 is an illustration of the modular array of the channels in cross flow form.

The gas manifolding can be either in cross flow or in counter flow with air inlet and fuel outlet on one side of the stack and air outlet and fuel inlet on the other side of the stack. FIG. 4 shows the modular stack array 41 where the fuel cells 44 are arranged in rows and the fuel and air are in a cross flow configuration. By cross flow, we mean that the fuel and air flow in directions at an angle of 90°. For example, the fuel inlet 43 is 90° from the air inlet 42 and the exhaust 46 is 90° from the air outlet 47. Thin electrode films can be grown over gas manifolds by using a sacrificial binder, e.g. a UV cured coating that is subsequently burned out on firing.

In a preferred embodiment, the cathode and anode are grown through the use of vapor deposition. The cathode is preferably a porous ceramic cathode about 100 microns thick or less. The electrolyte is preferably a ceramic electrolyte that is between about 0.01 to 3 microns thick. The anode is preferably a porous ceramic anode that is about 100 microns thick or less. The cathode and anode can be about 10 microns, for example. The interconnect can be grown in the same manner as the electrodes or the interconnect can be a metal, such as metallic foil or a ceramic. The interconnect is generally about 30 to about 100 microns thick, although it can be thinner.

In another embodiment, thin interlayers may be placed between the anode and electrolyte or between the cathode and the electrolyte. The thin interlayers are between about 0.001–1 micron thick and reduce polarization losses.

The electrolyte material is a dense ceramic, such as zirconia stabilized with aliovalent dopants like Y, Sc, In, and most of the late lanthanides, or it can consist of other dense ceramics with high ionic conduction and high transference number, such as bismuth or ceria doped yttria, gadolinia or samaria doped ceria, lanthanum-gallium derived oxides, etc. In addition to high ionic conduction, the electrolyte must be a good electronic insulator and also prevent diffusion of gases. The anode material is a porous ceramic, typically a cermet between metals like Ni or Cu and a phase identical or similar to the electrolyte material, e.g. a Ni-yttria-stabilized-zirconia cermet. The composition and concentration of the ceramic elements in the anode material needs not be the same as in the electrolyte. The cathode material is a porous ceramic, such as lanthanum-strontium-manganite or lanthanum-strontium-cobaltite, possibly doped with iron. The anode and cathode must have controlled porosity to optimize the transport of air and fuel to the reaction centers near the electrolyte. They must also have mixed ionic and electronic conductivity. In addition to the materials described above, both the anode and cathode may contain specific catalytic materials possibly in thin interlayers near the electrolyte to promote reaction and reduce polarization losses at low temperature operation. One advantage of this invention's approach is the ability to optimize performance through the deliberate formation of compositional and microstructural gradients through the thickness of individual layers.

The miniaturized fuel cell is produced through various processes that are common to the microelectronic industry but that are new to the fuel cell industry. Some of the techniques that could be used include chemical vapor deposition, molecular beam or atomic layer epitaxy, and micro lithography to produce the individual fuel cell components as well as the complex gas and fuel manifolds. The best opportunity for miniaturization is to decrease the repeat distance. To increase the power density by a factor of 10, it is necessary to reduce the repeat distance by about a factor of at least 10 while maintaining similar areal power density. This requires gas manifolds that are at most about 200 microns and electrode assemblies that are at most about 100 microns. In order to maintain low-pressure drops with relatively thin manifolds, it is necessary to decrease the path length of individual cells. When all of the individual layers (excluding gas channels) are at most 100 microns in thickness, there is no single layer that is self-supporting; therefore, the first fuel cell must be fabricated on a support, such as mica, sapphire, or stabilized zirconia. If the electrodes do not contain manifolding then the electrodes can be made thinner, about 10 microns. Even though no individual layer is self-supporting, by the time all the layers are grown together, the stack will be a strong, robust unit. This approach also eliminates many of the issues of sealing the various layers that occur in conventional designs.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention, e.g. the specific thicknesses and materials of individual fuel cell components.

What is claimed is:

1. A process for the manufacture of a miniaturized stacked solid-oxide fuel cell comprising:
   a) depositing an interconnect layer;
   b) depositing a first electrode layer on said interconnect;
   c) depositing an electrolyte layer on said first electrode layer;
   d) depositing a second electrode layer onto said electrolyte layer;
   repeating deposition steps a)–d) n times, where n is greater than 1, to fabricate said stacked fuel cell;
   wherein repeating the deposition steps to fabricate said stacked fuel cell is performed with a repeat distance of less than about 0.5 mm.

2. The process of claim 1, wherein depositing one of the layers comprises vapor deposition of the layer.

3. The process of claim 1, further comprising etching one of the layers.

4. The process of claim 1, wherein said first electrode is a porous ceramic cathode.

5. The process of claim 1, wherein said first electrode is about 100 microns thick or less.

6. The process of claim 1, wherein said first electrode is about 10 microns thick.

7. The process of claim 1, wherein said electrolyte is a ceramic electrolyte.

8. The process of claim 1, wherein said electrolyte is between about 0.01 micron and about 3 microns thick.

9. The process of claim 1, wherein said second electrode is a porous ceramic anode.

10. The process of claim 1, wherein said second electrode is about 100 microns or less.

11. The process of claim 1, wherein said second electrode is about 10 microns thick.

12. The process of claim 1, wherein an interlayer is placed between said first electrode and said electrolyte.

13. The process of claim 1, wherein an interlayer is placed between said second electrode and said electrolyte.

14. The process of claim 12 or 13, wherein said interlayer is about 0.001 to about 1 micron thick.

15. The process of claim 1, wherein said interconnect is metal.

16. The process of claim 1, wherein said interconnect is about 30 to about 100 microns thick.

17. The process of claim 1, wherein said interconnect is ceramic.

18. The process of claim 1, wherein said interconnect includes at least one manifold.

19. A process for the manufacture of a miniaturized stacked solid-oxide fuel cell comprising:
   a) depositing an interconnect;
   b) depositing a first electrode layer on said interconnect, wherein said first electrode layer contains at least one manifold for delivering gas and fluid mixtures;
   c) depositing an electrolyte layer on said first electrode layer;
   d) depositing a second electrode layer onto said electrolyte layer, wherein said second electrode layer contains at least one manifold for delivering gas and fluid mixtures; and
   repeating deposition steps a)–d) n times, where n is greater than one, to fabricate said stacked fuel cell,
   wherein repeating the deposition steps to fabricate said stacked fuel cell is performed with a repeat distance of less than about 0.5 mm.

20. The process of claim 19, wherein said interconnect is metal.

21. The process of claim 19, wherein said interconnect is about 30 to about 100 microns thick.

22. The process of claim 19, wherein said interconnect is about 10 microns thick.

23. The process of claim 19, wherein said interconnect is ceramic.

24. The process of claim 19, wherein said manifold is ceramic.

25. The process of claim 19, wherein depositing one of the layers comprises vapor deposition of the layer.

26. The process of claim 19, further comprising etching one of the layers.

27. The process of claim 19, wherein said first electrode is a porous ceramic cathode.

28. The process of claim 19, wherein said first electrode is about 100 microns thick or less.

29. The process of claim 19, wherein said electrolyte is a ceramic electrolyte.

30. The process of claim 19, wherein said electrolyte is between about 0.01 micron and about 3 microns thick.

31. The process of claim 19, wherein said second electrode is a porous ceramic anode.

32. The process of claim 19, wherein said second electrode is about 100 microns thick or less.

33. The process of claim 19, wherein an interlayer is placed between said first electrode and said electrolyte.

34. The process of claim 19, wherein an interlayer is placed between said second electrode and said electrolyte.

35. The process of claim 33 or 34, wherein said interlayer is about 0.001 to about 1 micron thick.

36. A miniaturized stacked solid-oxide fuel cell comprising:
   at least two fuel cells in a stack, said fuel cells comprising:
      a) an interconnect;
      b) a first electrode layer deposited on said interconnect;
      c) an electrolyte layer deposited on said first electrode layer; and
      d) a second electrode layer deposited on said electrolyte layer;
   wherein said fuel cell has a repeat distance of less than about 0.5 mm.

37. The fuel cell of claim 36, wherein said first electrode is a porous ceramic cathode.

38. The fuel cell of claim 36, wherein said first electrode is about 100 microns or less.

39. The fuel cell of claim 36, wherein said first electrode is about 10 microns thick.

40. The fuel cell of claim 36, wherein said electrolyte is a ceramic electrolyte.

41. The fuel cell of claim 36, wherein said electrolyte is between about 0.01 micron and about 3 microns thick.

42. The fuel cell of claim 36, wherein said second electrode is a porous ceramic anode.

43. The fuel cell of claim 36, wherein said second electrode is about 100 microns thick or less.

44. The fuel cell of claim 36, wherein said second electrode is about 10 microns thick.

45. The fuel cell of claim 36, further comprising an interlayer between said first electrode and said electrolyte.

46. The fuel cell of claim 36, further comprising an interlayer between said second electrode and said electrolyte.

47. The fuel cell of claim 45 or 46, wherein said interlayer is about 0.001 to about 1 micron thick.

48. The fuel cell of claim 36, wherein said interconnect is metal.

49. The fuel cell of claim 36, wherein said interconnect is about 30 microns to about 100 microns thick.

50. The fuel cell of claim 36, wherein said interconnect is ceramic.

51. The fuel cell of claim 36, wherein said interconnect includes at least one manifold.

52. A miniaturized stacked solid-oxide fuel cell comprising:
   at least two fuel cells in a stack, said fuel cells comprising:
      a) an interconnect;
      b) a first electrode layer deposited on said interconnect, wherein said first electrode layer contains at least one first manifold for delivering gas or fluid mixtures;
      c) an electrolyte layer deposited on said first electrode layer; and
      d) a second electrode layer on said electrolyte layer, wherein said second electrode layer contains at least one second manifold for delivering gas or fluid mixtures;
   wherein said fuel cell has a repeat distance of less than about 0.5 mm.

53. The fuel cell of claim 52, wherein said interconnect is metal.

54. The fuel cell of claim 52, wherein said interconnect is about 30 to about 100 microns thick.

55. The fuel cell of claim 52, wherein said interconnect is about 10 microns thick.

56. The fuel cell of claim 52, wherein said interconnect is ceramic.

57. The fuel cell of claim 52, wherein said first or second manifold is ceramic.

58. The fuel cell of claim 52, wherein said first electrode is a porous ceramic cathode.

59. The fuel cell of claim 52, wherein said first electrode is about 100 microns or less.

60. The fuel cell of claim 52, wherein said electrolyte is a ceramic electrolyte.

61. The fuel cell of claim 52, wherein said electrolyte is between about 0.01 micron and about 3 microns thick.

62. The fuel cell of claim 52, wherein said second electrode is a porous ceramic anode.

63. The fuel cell of claim 52, wherein said second electrode is about 100 microns thick or less.

64. The fuel cell of claim 52, further comprsing an interlayer between said first electrode and said electrolyte.

65. The fuel cell of claim 52, further comprising an interlayer between said second electrode and said electrolyte.

66. The fuel cell of claim 64 or 65, wherein said interlayer is about 0.001 to about 1 micron thick.

67. A modular stack array layout comprising:
   at least one fuel cell stack comprising:
      at least two fuel cells in a stack, said fuel cells comprising:
         a) an interconnect;
         b) a first electrode layer deposited on said interconnect;
         c) an electrolyte layer deposited on said first electrode layer; and
         d) a second electrode layer deposited on said electrolyte layer;
      wherein said fuel cell has a repeat distance of less than about 0.5 mm;
   a gas inlet adjacent to said fuel cell stack;
   an air inlet adjacent to said fuel cell stack and positioned at an angle of 90° relative to said gas inlet;
   a gas outlet adjacent to said fuel cell stack and positioned at an angle of 90° relative to said air inlet; and
   an air outlet adjacent to said fuel cell stack and positioned at an angle of 90° relative to said gas outlet.

* * * * *